Patented July 9, 1935

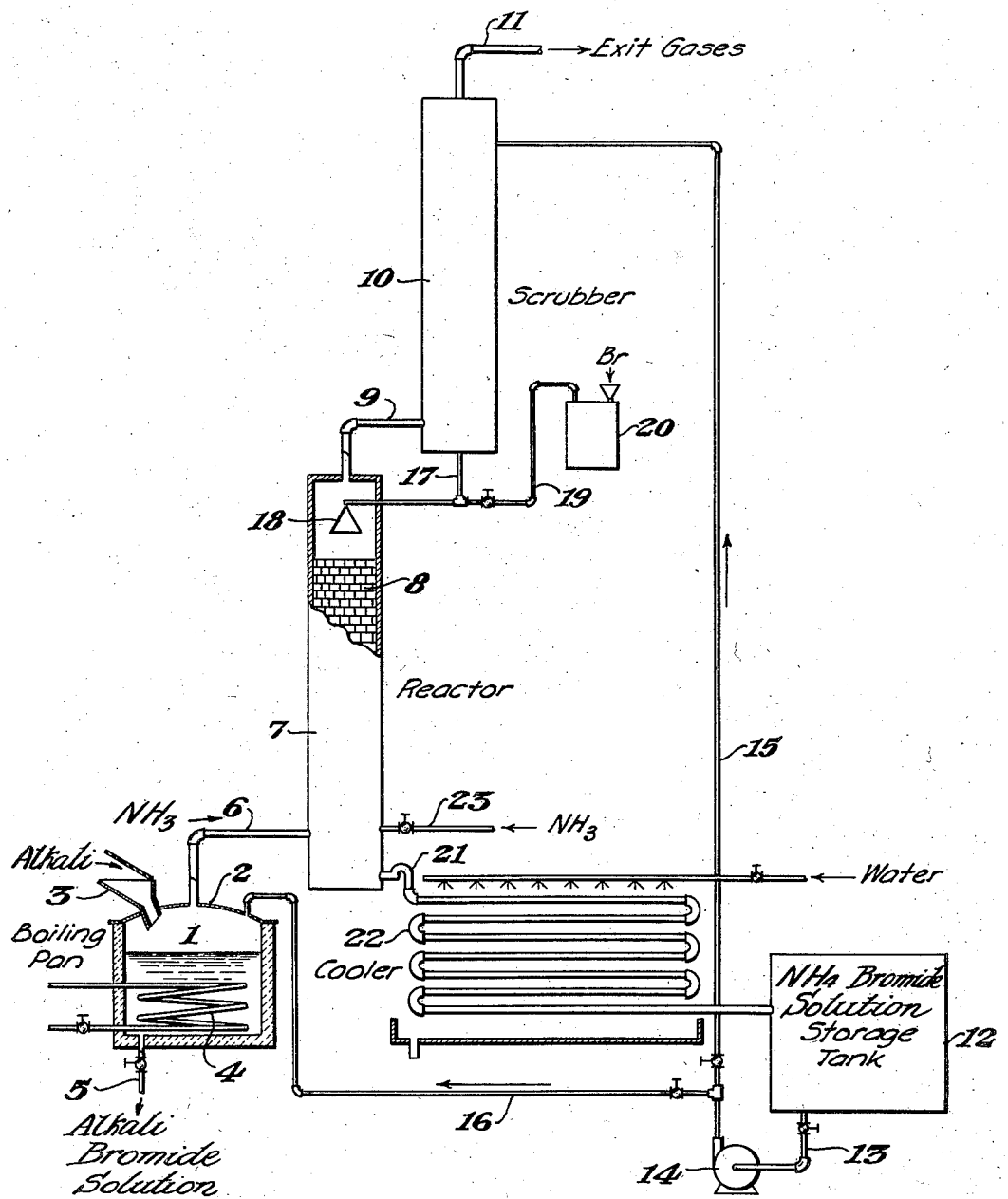

2,007,758

UNITED STATES PATENT OFFICE 2,007,758

METHOD OF MAKING BROMIDES

Ivan F. Harlow and Charles E. Short, Midland, Mich., assignors to The Dow Chemical Company, Midland, Mich., a corporation of Michigan Application February 20, 1933, Serial No. 657,523

9 Claims. (Cl. 23—89)

In the manufacture of commercial bromides, particularly alkali and alkaline earth metal bromides, the usual procedure has been to react bromine with the hydroxide or carbonate of the desired metal. Such method, as is well known, has the disadvantage that the bromide so formed is accompanied by some of the bromate produced according to the following characteristic equation, wherein M represents a univalent metal:—

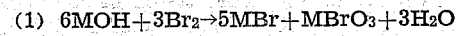
(1) $6MOH + 3Br_2 \rightarrow 5MBr + MBrO_3 + 3H_2O$

The purification of the reaction product for the removal of bromate is a tedious and troublesome operation, which adds materially to the cost of the final product.

It has been proposed to overcome the aforementioned difficulty by reacting bromine, first, with ammonia to produce directly ammonium bromide without formation of any bromate, according to the equation:—

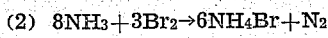
(2) $8NH_3 + 3Br_2 \rightarrow 6NH_4Br + N_2$ and then converting the ammonium bromide to the desired metal bromide by treating with a compound of the metal, e. g. the carbonate, oxide, or hydroxide thereof. When such alkali is used to react with ammonium bromide, ammonia is liberated and may be removed as gas by boiling the solution in which the reaction takes place, the recovery of the gas, however, requiring extensive absorption equipment, the operation of which adds to the cost of the bromide product.

An object of our invention is to provide improved and simplified procedure for the recovery of ammonia in such last-mentioned method, whereby the same is absorbed in water or an ammonium bromide solution and simultaneously reacted with bromine to reproduce ammonium bromide which may be employed for making a further quantity of the alkali bromide. Thus a cyclic mode of operation is set up which is advantageously adapted for continuous production. The improved method constituting our invention is fully set forth in detail in the annexed drawing and following description.

In said annexed drawing:—

The single figure is a diagrammatic representation of apparatus adapted for carrying out the method of the invention.

For the purpose of illustration our improved method will be described specifically for making sodium bromide, although it will be understood that similar procedure may be employed for making the bromides of alkali-forming metals generally, such as the alkali and alkaline earth metals and magnesium.

The theoretically equivalent proportion of sodium carbonate is added to a solution of ammonium bromide in a suitable vessel or still, and the mixed solution is boiled to vaporize ammonia and water until the solution is concentrated to the point where the dissolved salt, i. e. sodium bromide, will crystallize out upon cooling. The ammonia and water vapors are absorbed in an aqueous bromine solution, preferably an ammonium bromide solution containing bromine dissolved therein. A reaction takes place between the ammonia and bromine, according to Equation (2) above, whereby three-quarters of the ammonia is converted to ammonium bromide, the remainder being decomposed to form nitrogen. The presence of the aqueous medium is important for absorbing the heat generated by the chemical reaction and preventing the temperature from rising excessively. A portion of the ammonium bromide solution may be recycled to serve as medium for further reaction of bromine and ammonia, while the remainder may be used for reacting with sodium carbonate to produce more sodium bromide.

A convenient apparatus arrangement for carrying out the method is shown in the drawing. A boiling pan or kettle 1, having a lining of corrosion-resistant material, e. g. acid-proof cement or brick, is closed by a cover 2 in which is a closable feed hopper 3. Pan 1 is equipped with a steam coil 4 of corrosion-resistant iron-chromium alloy, or the equivalent, and a draw-off pipe 5. Through cover 3 a vapor pipe 6 leads to the lower part of a reactor 7. Reactor 7 may take the form of a tower constructed of corrosion-resistant material and provided with a body of packing material 8. From the top of tower 7 a vapor pipe 9 leads into the base of a scrubber 10, at the top of which is outlet 11 for exit gases. A storage tank 12 for aqueous liquor has a draw-off connection 13 to a pump 14, which in turn is connected with the top of scrubber 10 by means of pipe 15. A branch pipe 16 leads from pipe 15 into pan 1. From the base of scrubber 10 a pipe 17 leads to the upper part of reactor 7, terminating in a distributer head 18. A branch pipe 19 connects a bromine reservoir 20 with pipe 17. An outlet pipe 21 from the base of reactor 7 leads to a cooler 22, preferably made of glass or acid-proof ceramic ware, cooler 22 connecting with storage tank 12. Near the base of reactor 7 above outlet 21 is a pipe connection 23 for introducing ammonia.

For operating our improved method or process, a charge of ammonium bromide solution from tank 12 is pumped into pan 1 through pipe 16, after which the valve in the line is closed. Solid sodium carbonate is then added through hopper 3 in amount chemically equivalent to the ammonium bromide. The mixed solution is heated to boiling by means of steam coil 4, during which time ammonia is liberated, the gases passing along with evolved water vapor into reactor 7. Meanwhile ammonium bromide solution from tank 12 is pumped through pipe 15 to scrubber 10, whence it flows into reactor 7 through pipe 17, while bromine is added thereto from reservoir 20 and dissolves in the bromide solution. The solution flowing downwardly in reactor 7 contacts with the ammonia vapors rising therein. The bromine and ammonia react, producing considerable heat which is absorbed by the aqueous medium. The rate of boiling in pan 1 and the rate of flow of bromine solution to the reactor are regulated to avoid excessive temperature rise in reactor 7. Any vapors of ammonia or bromine escaping from the reactor are caught in scrubber 10 and returned to the reactor along with the bromine solution, while non-condensable gases are led away through exit pipe 11. The hot solution in reactor 7, containing the ammonium bromide formed in the reaction and increased in volume by condensation of water vapor from the boiling pan, flows to the cooler 22, wherein it is cooled by a water spray or other suitable medium applied to the exterior surface of the cooler coils. The cooled solution is then returned to tank 12. The boiling of the solution in pan 1 is continued until substantially all of the ammonia is driven off, and the concentration of the solution is raised to a suitable point for crystallizing the salt when the solution is cooled. The concentrated solution is then withdrawn and further treated by usual means to crystallize the bromide.

The strength of the ammonium bromide solution may be varied considerably, in general between about 5 and 30 per cent, depending upon the solubility of the metal bromide to be formed. For ordinary conditions a concentration of 20 to 25 per cent is satisfactory. It is desirable to maintain an approximately constant quantity of ammonium bromide in the system, and in any case excessive depletion of the solution must be avoided. The volume of ammonia vaporized from pan 1 corresponds to the bromide removed from the system, but in the reaction with bromine only three-quarters of such ammonia is converted to ammonium bromide, the remainder being lost as nitrogen in the exit gases. To make up for this loss, provision is made to add ammonia from an outside source by introducing the same into reactor 7 at the inlet 23, while sufficient bromine is admitted to the system to combine with the ammonia. The alkali added to the ammonium bromide solution in the boiling pan may be either a solution or in solid form. When a 20–25 per cent ammonium bromide solution is used for reacting with the alkali, it is preferable to add the alkali in solid form, thereby avoiding unnecessary dilution of the mixture and reducing the amount of water to be evaporated in concentrating the alkali bromide solution to the degree required for crystallizing. In any case, however, the strength of solution and the condition of the added alkali, whether solution or solid, may be chosen as a matter of economy or convenience, the invention not being dependent upon any particular degree of concentration of the solution or solutions employed.

Instead of sodium carbonate we may employ sodium hydroxide to react with the ammonium bromide, and the corresponding potassium compounds may be employed in similar manner. When employing the carbonate, the last traces of ammonia are removed from the boiling solution with difficulty, but this may be overcome by adding a small amount of the hydroxide to the hot concentrated solution and continuing the boiling for a short time after such addition. The amount of hydroxide added should be sufficient to raise the solution to a pH value approximately between 10 and 12. In the case of preparing the alkaline earth metal or magnesium bromides, it will be preferable to employ the corresponding metal hydroxide, instead of the carbonate, to react with ammonium bromide.

The following example is illustrative of results obtainable by working according to our improved method. A 25 per cent ammonium bromide solution was placed in a closed vessel connected to a vertical column filled with packing material, and substantially the chemically equivalent amount of anhydrous sodium carbonate was added. The mixture was heated to boiling, the escaping ammonia and water vapor passing into the aforesaid column wherein they were contacted with a downflowing stream of 25 per cent ammonium bromide solution containing bromine dissolved therein. Reaction occurred between the ammonia and bromine, with evolution of heat which was absorbed by the solution. The latter was conducted from the bottom of the column to a cooler wherein it was cooled to about room temperature, and recirculated through the column. The boiling mixture in the reaction vessel was heated until its volume was reduced to about one-half of the original volume. Then a small amount of sodium hydroxide was added, sufficient to raise the solution to a pH value between 10 and 12, the boiling being continued a short time thereafter. The solution of sodium bromide so obtained had a gravity of 48° Bé., the bromide content corresponding to 99.6 per cent of the bromide content of original ammonium bromide solution, while the ammonia content was only 0.03 per cent. The ammonia recovered in the column amounted to 74.2 per cent of the ammonia content of the original ammonium bromide solution, being a recovery of 99 per cent of the theoretical maximum.

By the herein described procedure we are enabled to prepare bromides of the alkali and alkaline earth metals or magnesium in highly pure form, free from bromates and ammonia. The ammonia liberated by the chemical reaction is directly recombined with bromine in the most simple and economical way and reconverted to ammonium bromide in substantially the theoretical maximum amount without formation of any bromate. In the ammonia absorption step an aqueous bromine solution may be substituted for the ammonium bromide solution of bromine as described, but naturally with continuous recycling of the absorbing solution containing the ammonium bromide thereby formed produces the same result as if such a solution were taken originally.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. A method of making bromides which comprises adding an alkali to an ammonium bromide solution, vaporizing ammonia from the resulting reaction mixture, absorbing such ammonia in an ammonium bromide solution of bromine, adding more bromine to such solution and returning the same to the said absorbing step.

2. A method of making bromides which comprises adding an alkali from the group consisting of the hydroxides of the alkali metals, alkaline earth metals and magnesium and of the alkali metal carbonates to an ammonium bromide solution, heating the mixture to vaporize ammonia therefrom, absorbing the vaporized ammonia in an ammonium bromide solution of bromine, cooling the absorbing solution, adding more bromine thereto and returning the same to the said absorbing step.

3. A method of making bromides which comprises adding an alkali from the group consisting of the hydroxides of the alkali metals, alkaline earth metals and magnesium and of the alkali metal carbonates in solid form to an approximately 20 to 25 per cent ammonium bromide solution in substantially chemically equivalent proportions, boiling the mixture to vaporize substantially all ammonia therefrom, absorbing the vaporized ammonia in an ammonium bromide solution of bromine, cooling the absorbing solution, adding more bromine thereto and returning the same to the said absorbing step.

4. A method of making bromides which comprises adding solid sodium carbonate to an approximately 20 to 25 per cent ammonium bromide solution in substantially chemically equivalent proportions, boiling the mixture to vaporize substantially all ammonia therefrom, absorbing the vaporized ammonia in an ammonium bromide solution of bromine, cooling the absorbing solution, adding more bromine thereto and returning to the absorbing step.

5. A method of making bromides which comprises adding solid sodium carbonate to an approximately 20 to 25 per cent ammonium bromide solution in substantially chemically equivalent proportions, boiling the mixture to vaporize most of the ammonia therefrom, adding a small amount of sodium hydroxide sufficient to produce in the solution a pH value between 10 and 12, continuing the boiling to expel the last portion of ammonia, absorbing the vaporized ammonia in an ammonium bromide solution of bromine, cooling the absorbing solution, adding more bromine thereto and returning to the absorbing step.

6. A method of making bromides which comprises adding to an ammonium bromide solution an alkali from the group consisting of the hydroxides of the alkali metals, alkaline earth metals and magnesium and of the alkali metal carbonates, heating the mixture to vaporize ammonia therefrom, absorbing the vaporized ammonia in an ammonium bromide solution of bromine, cooling the absorbing solution, returning a portion of said solution to said first step for the ammonium bromide solution therein, adding more bromine to another portion of said solution and returning such bromine solution to said absorbing step.

7. A method of making bromides which comprises adding to an approximately 20 to 25 per cent ammonium bromide solution a substantially chemically equivalent amount of an alkali from the group consisting of the hydroxides of the alkali metals, alkaline earth metals and magnesium and of the alkali metal carbonates, boiling the mixture to vaporize substantially all ammonia therefrom, absorbing the vaporized ammonia in an ammonium bromide solution of bromine, cooling the absorbed solution, returning a portion of the cooled solution to said first step as the ammonium bromide solution therein, adding more bromine to another portion of said cooled solution and returning such bromine solution to said absorbing step.

8. A method of making bromides which comprises adding sodium carbonate in solid form to an approximately 20 to 25 per cent ammonium bromide solution in substantially chemically equivalent proportions, boiling the mixture to vaporize substantially all ammonia therefrom, absorbing the vaporized ammonia in an ammonium bromide solution of bromine, then cooling the absorbed solution, returning a portion of said cooled solution to said first step for the ammonium bromide solution, adding more bromine to another portion of said cooled solution and returning such bromine solution to said absorbing step.

9. A method of making bromides which comprises adding sodium carbonate in solid form to an approximately 20 to 25 per cent ammonium bromide solution in substantially chemically equivalent proportions, boiling the mixture to vaporize most of the ammonia therefrom, adding a small amount of sodium hydroxide sufficient to produce in the solution a pH value between 10 and 12, continuing the boiling to expel the last portion of ammonia, absorbing the vaporized ammonia in an ammonium bromide solution of bromine, then cooling the absorbed solution, returning a portion of said cooled solution to said first step for the ammonium bromide solution therein, adding more bromine to another portion of said cooled solution and returning said bromine solution to said absorbing step.

IVAN F. HARLOW.
CHARLES E. SHORT.